(12) United States Patent
Elliott, Jr.

(10) Patent No.: US 7,872,849 B2
(45) Date of Patent: Jan. 18, 2011

(54) LASER ENGAGEMENT STUN SYSTEM

(76) Inventor: John Bernard Elliott, Jr., 9309 Lanneau Ct., Bakersfield, CA (US) 93311

( * ) Notice: Subject to any disclaimer, the term of this patent is extended or adjusted under 35 U.S.C. 154(b) by 1057 days.

(21) Appl. No.: 11/818,946

(22) Filed: Mar. 15, 2006

(65) Prior Publication Data

US 2007/0297117 A1    Dec. 27, 2007

(51) Int. Cl.
*H01T 23/00*    (2006.01)
(52) U.S. Cl. ...................................................... 361/232
(58) Field of Classification Search .................. 361/232
See application file for complete search history.

(56) References Cited

U.S. PATENT DOCUMENTS

| | | | | |
|---|---|---|---|---|
| 6,604,946 | B2 * | 8/2003 | Oakes | 434/11 |
| 6,755,653 | B2 * | 6/2004 | Varshneya | 434/22 |
| 6,770,865 | B2 * | 8/2004 | Wootton et al. | 250/226 |

\* cited by examiner

*Primary Examiner*—Stephen W Jackson

(57) ABSTRACT

The Laser Engagement Stun System, which is a man Worn Apparatus is designed for Training exercises in Force-on Force or One-on-One training. The L.E.S.S. system receives and analyzes incoming laser light signals while disregarding ambient light signals from the environment. It then generates a High Voltage low amperage pulsed shock or stun that is delivered to the person wearing the LESS. Each person in the exercises will be equipped with the Laser Engagement Stun System. A component and vital part of the system is the weapons mounted Visible Laser Light device attached to each persons weapon. The attached laser light device will be activated when the individual person pulls the trigger on their weapon and cause a Blank Round to be discharged or from a Dry Fire. When the person so equipped as described above with LESS, and weapons mounted Laser Light device, the person may aim his weapon at the opponent and shoot a blank or dry fire and if the aim was true and the laser light strikes the Sensor on the LESS, the person wearing the LESS will feel a mild electrical shock or stun to simulate a bullet hitting that person. Realism during training has become more and more valuable in preventing lives being lost, wounds and other injuries from being sustained because of the lack of realism during training. Only a system wherein the person experiencing the Tactile notification of being hit by a bullet and killed or wounded can prevent the possibility of that reality. Laser Engagement Stun System can address the Age Old problem of FRATRICIDE OR FRIENDLY FIRE. A back Sensor panel and rear helmet Sensor can detect and stun a friendly in a special location that can be immediately identified as FRIENDLY FIRE.

20 Claims, 10 Drawing Sheets

LASER ENGAGEMENT STUN SYSTEM

BACKGROUND OF THE INVENTION

This invention relates generally to the field of apparatus for a FORCE-ON FORCE Training system. Moreover it pertains specifically to such apparatus for Force-on Force Training where Realism is a key part of imparting the importance of the Lesson of the Day i.e. DON'T GET KILLED. The age old problem of training Soldiers for the field or Police Officers for Hostile Engagements in the line of duty has been and will always be one of the most intense and concentrated efforts during the training period one will receive when their job requirement demands the very best performance. Hell Week that our Navy Seals receive gives one the idea of what it really takes to be the very best. Because of time and money restrictions and the need to impart the best training to as many as possible in the shortest amount of time, Realistic training is now being extended from Elite Force to the line soldier or line officer and other security personnel. Simulations of all kinds are available to our training officers depending on the job requirement and the budget restraints. Shooting simulators bring the battlefield indoors for more realism Outdoors mass training and exercises using M.I.L.E.S. OR Multiple Integrated Laser Engagement System that the Army and marines have been using for about 25 years in our military took the training to yet another level. Force-on-Force MILES training allowed for the individual to be counted as a Kill or hit during Wars games and other exercises. A buzzer would alert the person wearing the MILES that he has just been shot and that person would be taken out of the exercise. The LASER ENGAGEMENT STUN SYSTEM can be used in the same manner to train Force-on-Force but with a real difference! LESS will immediately through a TACTILE NOTIFICATION IN THE FORM OF A ELECTRICAL SHOCK/STUN ALERTS THE PERSON WEARING THE LESS GEAR THAT HE HAS BEEN SHOT. IT WILL ALSO ADDRESS FRATRICIDE OR FRIENDLY FIRE SITUATIONS The Laser Stun System WILL NOT CAUSE ANY PHYSIOLOGICAL DAMAGE TO THE PERSON RECEIVING THE SHOCK/STUN.

DESCRIPTION OF RELATED ART

Figure 2:
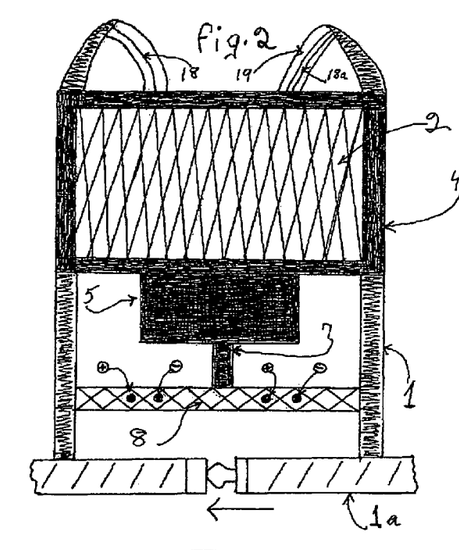
FIG. 2. is a front view of a 30) The drawing depicts the Laser Engagement Stun System apparatus mounted on load bearing suspenders attached to a waste Belt with the 2 Sensor in front FIG. 3. Is a rear view of a 31) The drawing depicts the Laser Engagement Stun System mounted as described in FIG. 2. Depicting the two rear 16,17 Sensors According to the present invention.

Many devices have been proposed for 45) A man worn receiver harness that is capable of receiving and incoming laser light to activate the system. The incoming laser light is pulsed or coded to send a specific coded signal that after being received by the man worn vest infrared sensor can cause a secondary signal to send a RF to a command post to alert the people who are monitoring the situation that a particular person who was assigned that man worn vest has be struck by a laser from an opposing teams weapon. These types of systems are used mostly for Laser Tag games and for Force on Force training in our military. The incoming laser signal up to this point in time has almost always been an infrared laser that require infrared detector as the sensor. The system of most note is the Military training system called MILES, or Multiple Integrated Laser Engagement System. The Laser Engagement Stun System is a more direct way to accomplish what the MILES systems has accomplished. The Laser engagement stun system, hereafter called LESS, is a man worn harness or device that is used for Laser Tag or Military, SWAT teams, or Special Warfare-Special Operations teams. The LESS system uses a Amorphous Solar Cell as the laser light detector. It requires a bright red visible laser light to strike it before it will register a spike or recognize the red light. The red laser light, normally in the 620, to 650 nanameter range 5-10 milli-watt. Realism is always an advantage over passive notification. The LESS man worn receiver vest or harness, or load bearing suspenders will have affixed to the outside, two or more large amorphous solar cells acting as the sensors. When the solar cells is struck or receive the incoming laser pulse from a laser that has been mounted on the opposing teams weapon, the following occurs. The amorphous solar cells receives the red laser light that is pulsed and coded. The electronic printed circuit board that is situated and connected to the amorphous solar cell and the electronics on the board must discriminated between the pulsed laser light and ambient light sources that are also acting upon the solar cell. A specific pulse as described in FIG. 2 and attached to the provisional patent. The 500 MHZ pulsed described works well. Other frequencies will work as well but they must discriminate precisely between ambient light sources and the red laser light pulse. Once the incoming light is received the printed circuit board can be designed to trigger a multitude of other devices, RF, a electrical Stun, a vibrator, a strobe light, sonic alert etc. etc.

Some of these devices are found in patent numbers, 46) U.S. Pat. No. 4,695,058 Carter, 111 George A. Sep. 22, 1987 . . . U.S. Pat. No. 5,426,295 Parikh Himanshu N. June, $20^{th}$ 1995 . . . U.S. Pat. No. 5,788,500 Gerber, Peter Aug. 4, 1998 . . . U.S. Pat. No. 6,174,169 Gerber, Peter Jan. $16^{th}$ 2001 . . . U.S. Pat. No. 6,863,532 Ambrosoli, Franco March $8^{th}$ 2005 . . . U.S. Pat. No. 7,052,276 B2 Davidson, Stefan May $30^{th}$ 2006.

These devices are limited in their function, 47) U.S. Pat. No. 4,695,058t describes a laser tag system is inferior because the laser stun engagement system can accomplish all the tasks the laser tag system can perform and do the following tasks that the laser tag system cannot do, LESS can send a tactile electrical shock notification to the person wearing the man worn vest, LESS is self charging from ambient light during use and between being used thereby extending time in the field for the person wearing the vest.

U.S. Pat. No. 5,426,295 described the MILES system as used by the military for force on force training. LESS is an improvement to the miles system in that LESS can perform all of the MILES tasks and do theses tasks that MILES cannot do. LESS can send a tactile electrical shock to simulate being shot or wounded in action, LESS will re-charge the battery while it is being used and between uses if exposed to light, thereby extending its time of use in the field, the LESS man worn harness will cost$ approximately of what the MILES ,man worn receiver vest cost, saving money for the end user. LESS is very rugged and durable. Unlike silicon solar cells that are glass like in nature, Amorphous solar cells are flexible and can be punctured and they will still function. The LESS system using a visible red laser light will allow the shooter to see where the light is going much like a tracer bullet. It is more realist when the shooter can see the light going out, thereby giving his location away to the opposite team. conversely the opposing team will spot where the incoming shots are coming from, this will train the shooter to take cover faster. U.S. Pat. No. 5,788,500 is very similar to U.S. Pat. No. 5,426,295 the MILES gear. U.S. Pat. No. 5,788, 500 has more to do with the type of code used in a force on force field training exercise. The advantages of LESS over this device is the same as for the MILES gear.

U.S. Pat. No. 6,174,169 B1, The advantage of LESS over this device is the same as for the MILES gear. U.S. Pat. No. 6,863,532 is a target notification system. This patent is included because it shows that when a laser light is being emitted from a weapon, simulated weapon or other means, the receiving target must have a means to notify the shooter and or wearer that a hit has been made. U.S. Pat. No. 7,052,276 describes a method for using both light rays i.e. laser beam and radio waves in conjunction to notify the shooter that he hit the target subject and to notify the person wearing the receiver vest that he has been hit via an audible signal. The major claim in this patent Appears to be that if an object like a bush or wall is in the way, the shot can still be good i.e. shooting through the bush or wall to hit the subject target. This has more to do with coding of the of the light and radio waves to coincide with one another. The laser engagement stun system (LESS) is an improve to this system because it can perform all the tasks this man worn vest can accomplish and use visible laser light while recharging its system and deliver a tactile electrical shock (stun) to the person wearing the LESS vest to simulate a bullet wound.

SUMMARY OF THE INVENTION

In view of the limitations now present in the prior art, the present invention provides a new and useful 6) Force on Force Training System that will TACTILELY NOTIFY the person wearing LESS that he has been shot because HE WILL FEEL IT. It will address FRATRICIDE OR FRIENDLY FIRE. And which is simpler in construction, more universally usable and more versatile in operation than known apparatus of this kind the purpose of the present invention is to provide a new 7) Laser Engagement Stun System L.E.S.S. for Force on Force training by Military, Police other Special Forces. Device that has many novel features not offered by the prior art apparatus that result in a new Low cost, Heavy Duty, Training System that uses High Voltage electrical shocks for Tactile notification of a person being shot by a Laser Bullet during WAR games or other exercises. Device which is not apparent, obvious, or suggested, either directly or indirectly by any of the prior art apparatus The Laser Engagement Stun System is a Man Worn Apparatus that uses Thin Film Amorphous Solar Cells as a Sensor to detect a Laser Light being shot at it from an opposing force. The Electronics on the Printed Circuit Board will convert the incoming laser light signal into a High Voltage Electrical Shock/Stun. The person wearing the LESS in the Force on Force training exercise will experience the shot by feeling it. All those participating in the Force on Force training exercise will be equipped with the Laser Engagement Stun System and all weapons in the small arms category will be equipped with a 500 HZ Laser Light Device inside or mounted outside their weapon. When the shooter is shooting at the opposing force and pulls the trigger on his weapon either a blank round will fire or a Dry fire will activate the Visible Laser Light that will be emitted by their weapon. This coded signal will activate the Solar Cell Sensor located on the LESS gear worn by the opponent. The LESS electronic circuit will generate a 50,000 Volt Low Amperage Shock for one sec. The opponent will feel a stinging or stun from the Electrical shock to SIMULATE BEING HIT BY A BULLET.

The foregoing has outlined, in general, the physical aspects of the invention and is to serve as an aid to better understanding the more complete detailed description, which is to follow. In reference to such, there is to be a clear understanding that the present invention is not limited to the method or detail of construction, fabrication, material, or application of use described and illustrated herein. Any other variation of fabrication, use, or application should be considered apparent as an alternative embodiment of the present invention.

Accordingly several advantages and objects of the present invention are:

A principal object of the present invention is to provide a Method to notify a person training in an exercise that his Sensor on his laser light detector system has been hit with a Laser Bullet which he will feel by experiencing a High Voltage Low Amperage Electrical Shock or Stun to his body. This will overcome a major discrepancy in the deficiencies of the prior art devices.

An object of the present invention is to provide military and other personnel in a Hostile engagement situation to use more caution to prevent their being Wounded or Killed in Action KIA and allow them to more readily recognize situation that might put them or their fellow comrade in Arms in harms way.) This new device that will be used for training exercises will take training and realism to a new level not experienced in the prior art.

Another object of the present invention is to provide a A method to address the Age Old Problem of FRATRICIDE or FRIENDLY FIRE. The Laser Engagement Stun System will have Sensors mounted on the rear of the friendly forces HELMET and on the BACK of the person wearing the L.E.S.S so that when a friendly is hit with friendly fire a STUN to the person wearing the LESS and a special buzzer or Radio Frequency signal will notify the Squad leader and the Command Center Immediately. One team will have odd number RF, Chips in their equipment and the other will have even number RF, Chips in their equipment so It will be immediately obvious who shot who! Friendly Fire is a major concern for every field commander and squad leader and has never been adequately addressed as to how to prevent it. It is important that the Friendly Fire activate the LESS so it will STUN the person receiving the Friendly fire because that person may have stepped in front of a Friendly's weapon or otherwise inadvertently put himself in HARMS WAY.)

It is intended that any other advantages and objects of the present invention that become apparent or obvious from the detailed description or illustrations contained herein are within the scope of the present invention.

BRIEF DESCRIPTION OF THE DRAWINGS

The following drawings further describe by illustration the advantages and objects of the present invention. Each drawing is referenced by corresponding figure reference characters within the "DETAILED DESCRIPTION OF THE INVENTION" section to follow.

DETAILED DESCRIPTION OF THE INVENTION

The laser engagement stun system according to the illustrated embodiment includes a laser device arranged to generate a coded pulse laser comprising light in the form of a coded pulse and a man worn apparatus arranged to be worn by a user and being separate from the laser device.

The man worn apparatus includes electrical contacts supported on the apparatus so as to be arranged to deliver a high voltage stun to a user of the apparatus. A solar cell is also supported on the apparatus in which the solar cell is arranged to generate a coded signal in response to being electrically charged by the coded pulse laser from the laser device.

An electronic circuit board is also supported on the apparatus in which the electronic circuit board is arranged to detect the coded signal from the solar cell such that the electronic circuit board can discriminate between ambient light and the coded pulse laser, and the electronic circuit board being arranged to convert the coded signal to a high voltage stun delivered to the electrical contacts. Accordingly, the system is arranged for force on force training or in conjunction with a shooting simulator shoot back system.

The solar cell comprises a thin film flexible amorphous solar cell.

In the illustrated embodiment, the laser comprises a red laser in a range of approximately 630 to 650 nanometers and the coded pulse of the laser corresponds to 500 Hz to 1500 Hz.

A filter covers the solar cell in which the light of the laser and the filter are the same color such that the solar cell is less sensitive to light having a different color than the light of the laser.

In the illustrated embodiment, the laser comprises a red laser and the filter comprises a red filter such that the solar cell is less sensitive to other than red light.

The electronic circuit board is arranged to deliver the high voltage stun to the electrical contacts via hard wires.

The apparatus can comprise a vest arranged to be worn by the user or a belt arranged to be worn by the user.

The electronic circuit board includes a timer in which the timer is arranged to control duration of the high voltage stun to a prescribed duration of the timer.

The timer can also be arranged to prevent delivery of a second high voltage stun to the electrical contacts subsequent to delivery of a first high voltage stun for a prescribed duration of the timer. The timer is arranged to restart the prescribed duration in response to the detection of a coded signal from the solar cell during the prescribed duration.

In the illustrated embodiment the laser device comprises a weapon which is arranged to emit the coded pulse laser in response to the weapon being triggered by a second user different from the user upon which the apparatus is arranged to be worn.

The electronic circuit board is also arranged to trigger a visual indicator in response to detection of the coded signal and to trigger an audible indicator in response to detection of the coded signal.

A vibrator motor can be supported on the apparatus such that the electronic circuit board is arranged to selectively actuate the vibrator motor instead of delivering the high voltage stun to the electrical contacts.

A battery associated with the electronic circuit board can be charged by the electronic circuit board in response to the solar cell being electrically charged by ambient light. There can also be provided an auxiliary solar cell which is unfiltered and also arranged to charge the battery.

The electronic circuit board can be arranged to transmit a radio frequency signal to a remote location, the radio frequency signal corresponding to an identification of the coded pulse laser.

Referring now descriptively to the drawings, the attached figures illustrate a New Method for training with Realism when Force-on-Force training demands the very best and with the most realistic training equipment available.

Figure 1:
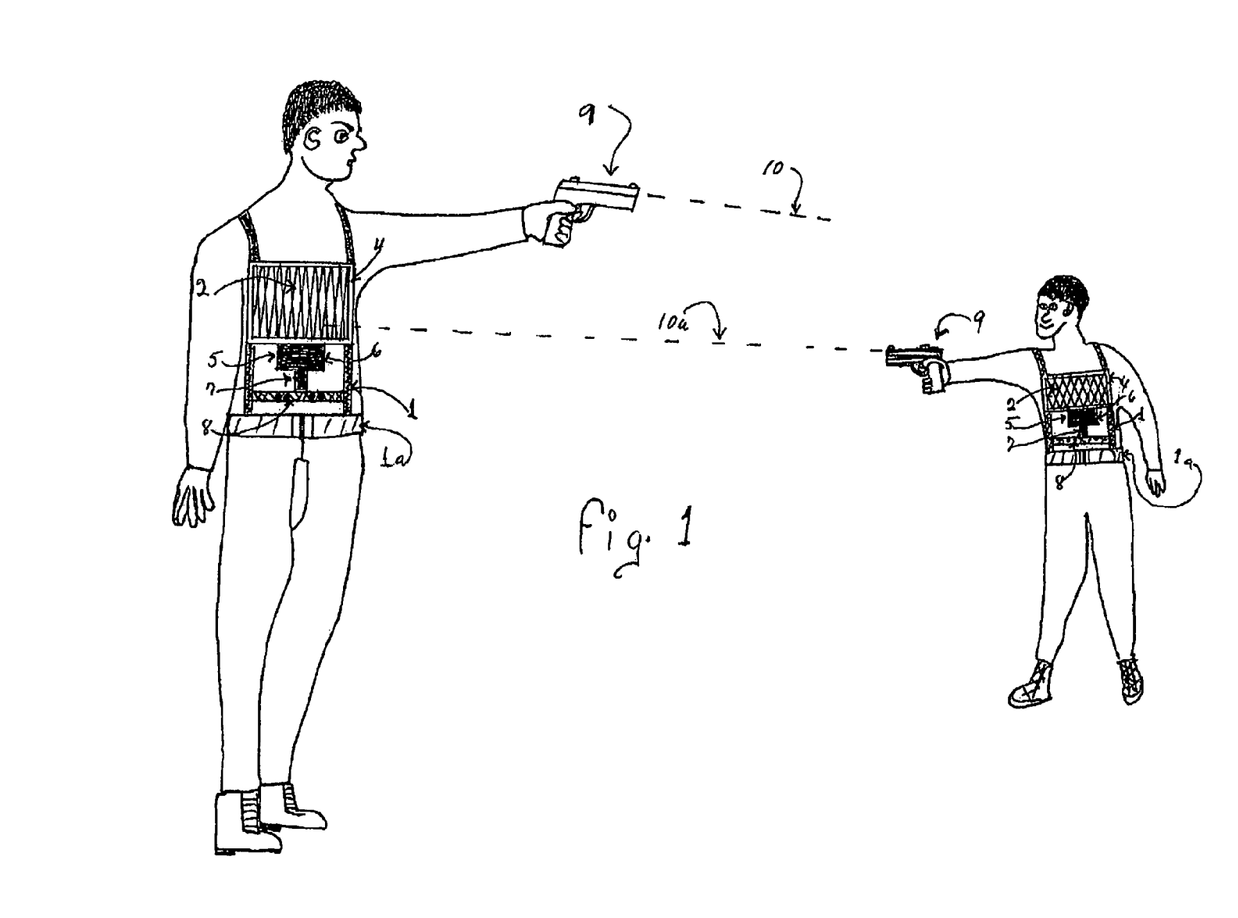
FIG. 1 is a perspective view of a 29) The drawings depict two Laser Engagement Stun System as they looks while being worn by two people who are shooting Laser Bullets at one another. According to the present invention.
Figure 3:
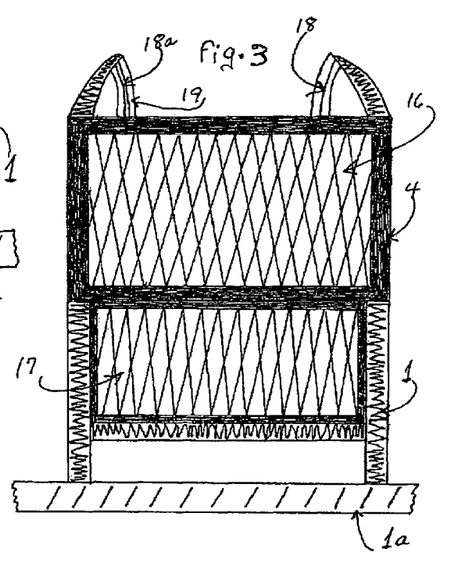
Figure 4:
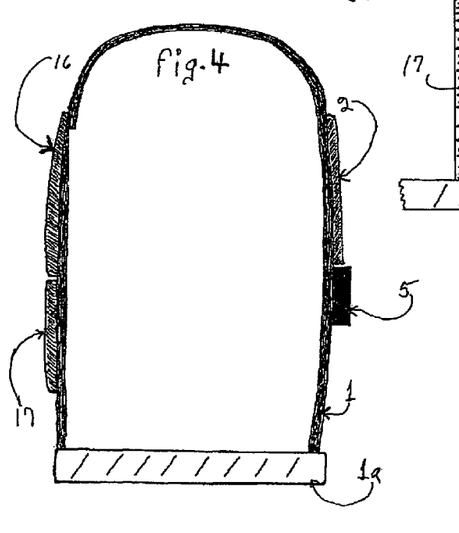
FIG. 4. Is a side view of a 32) The drawing depicts the Laser Engagement Stun System mounted on load bearing suspenders and a waste Belt such as a Web Belt according to the present invention.
Figure 5:
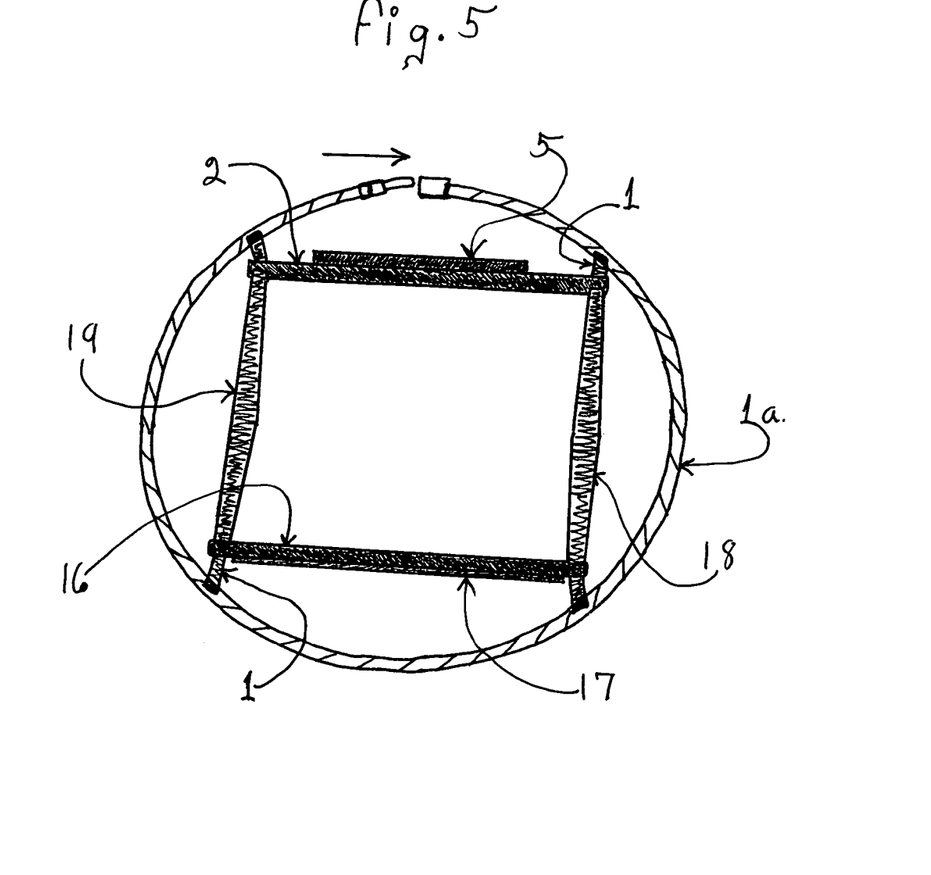
FIG. 5. No TOP VIEW.
Figure 6:
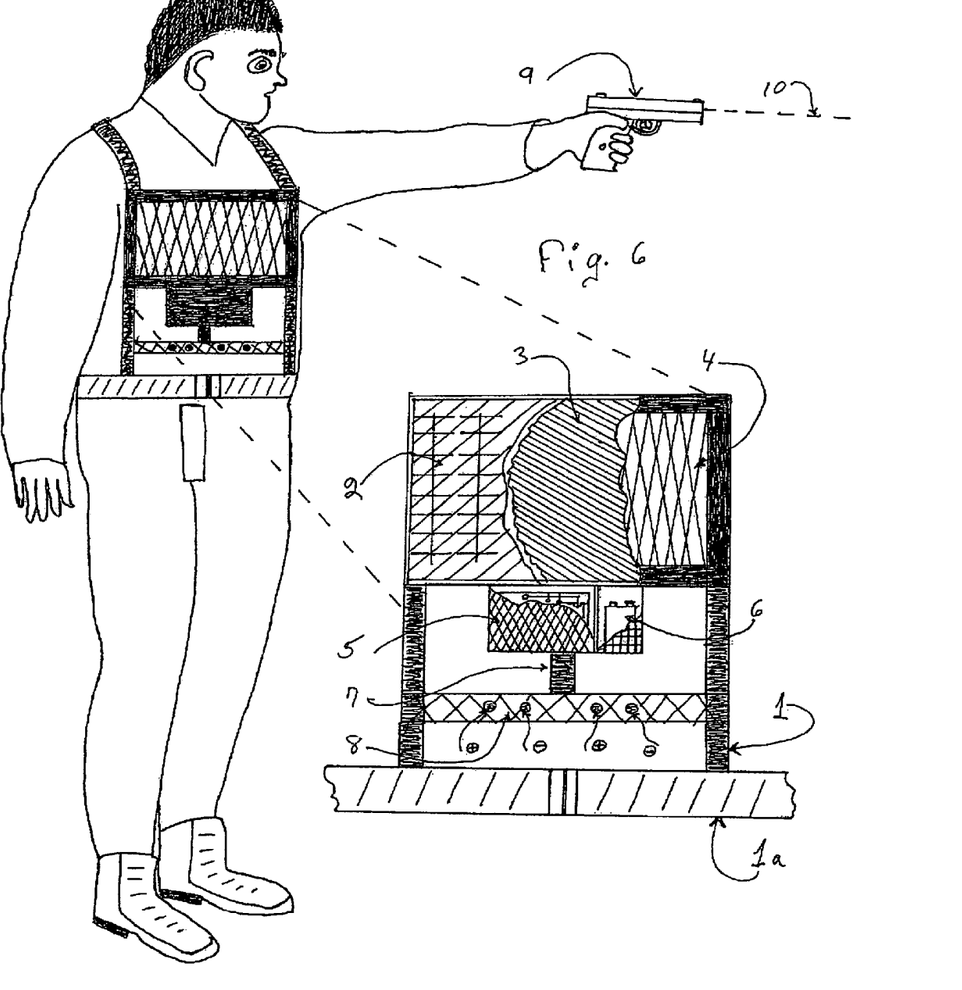
FIG. 6. The drawing depicts a Sectional view of the Laser Engagement Stun System. It is a blown up view of the person depicted on the left in FIG. 1.
Figure 7:
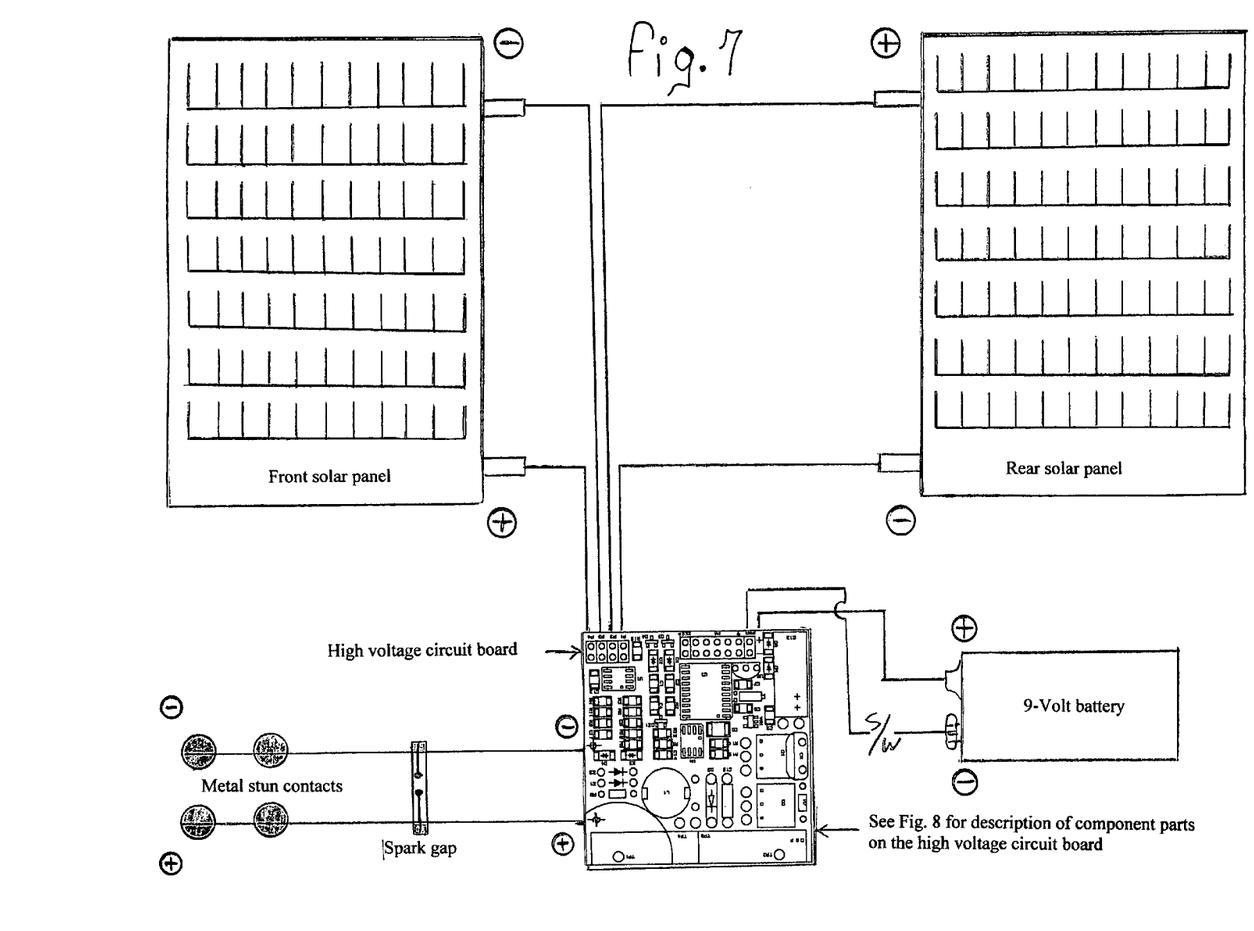
FIG. 7. Is a Electrical Diagram of how the Solar Cells, Printed Circuit Board, Battery power, Spark Gap, and Metal stun contacts are connected to make the L.E.S.S. function.
Figure 8:
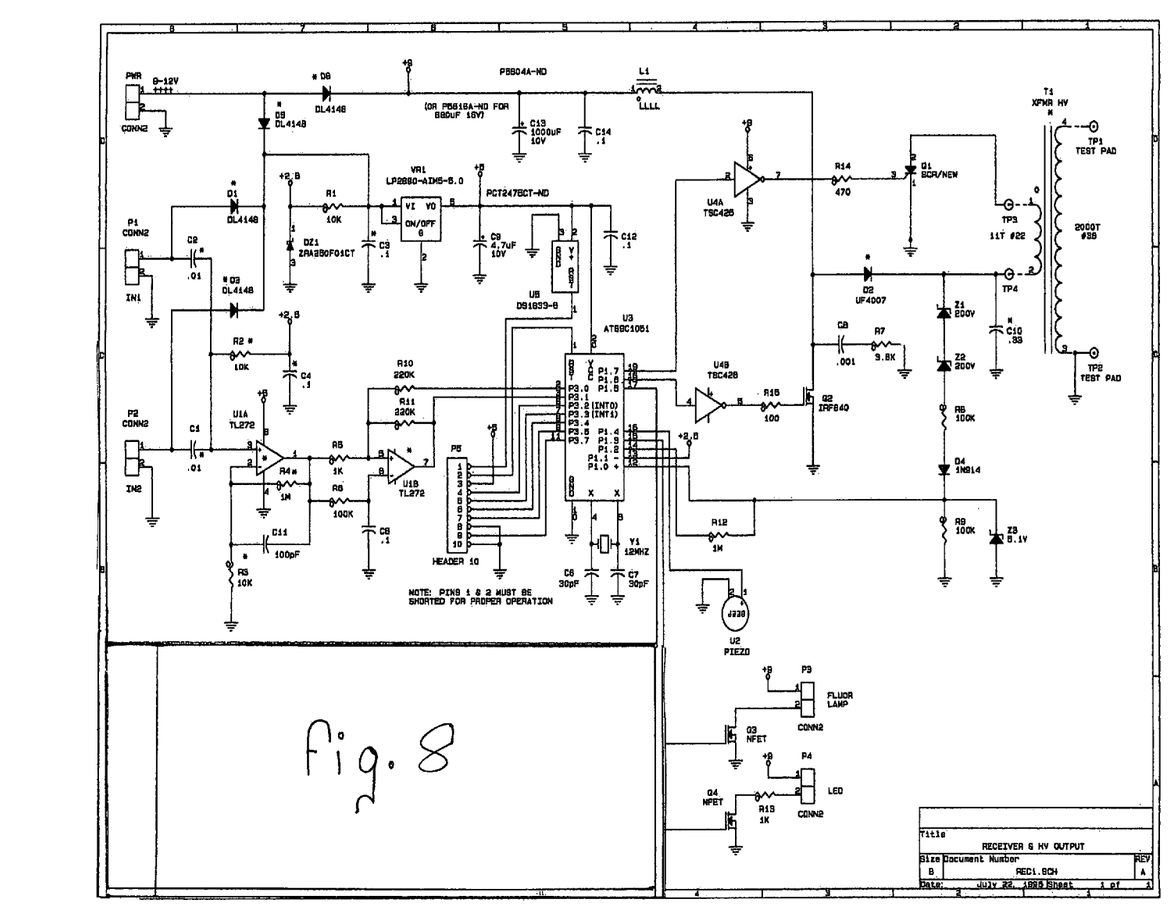
FIG. 8. Is the Electrical Schematic for the Laser Engagement Stun System Receiver and High Voltage.
Figure 9:
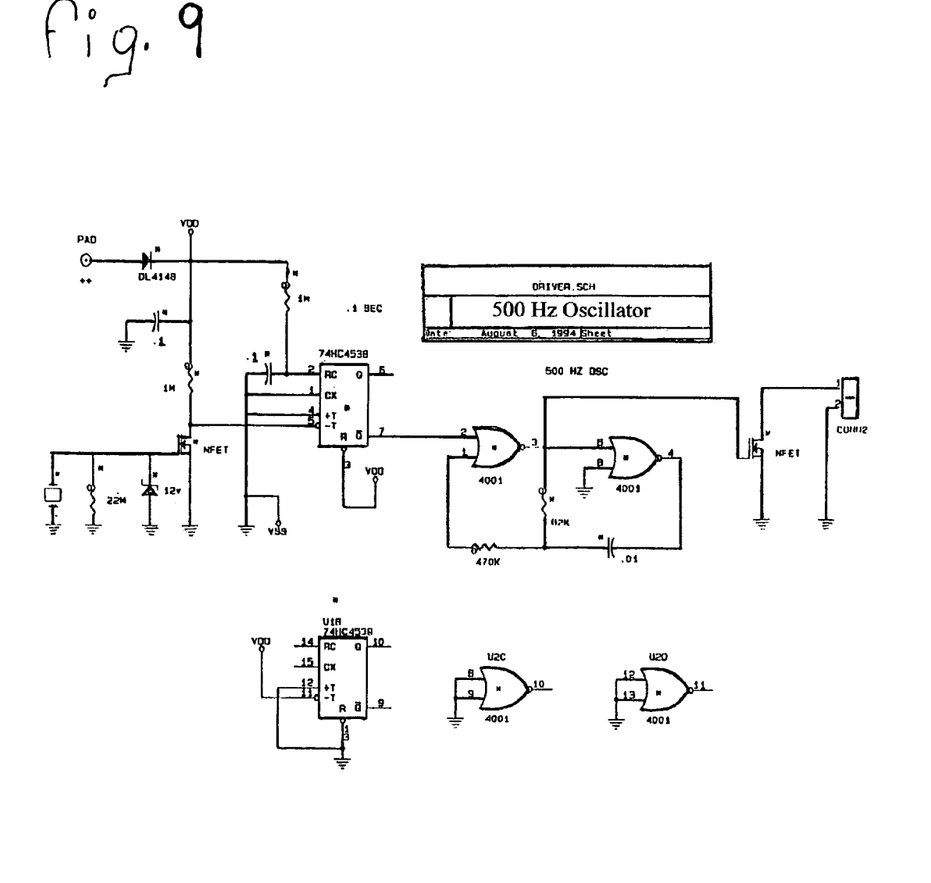
FIG. 9. Is the Electrical Schematic for the Weapons mounted Visible Laser.
Figure 10:
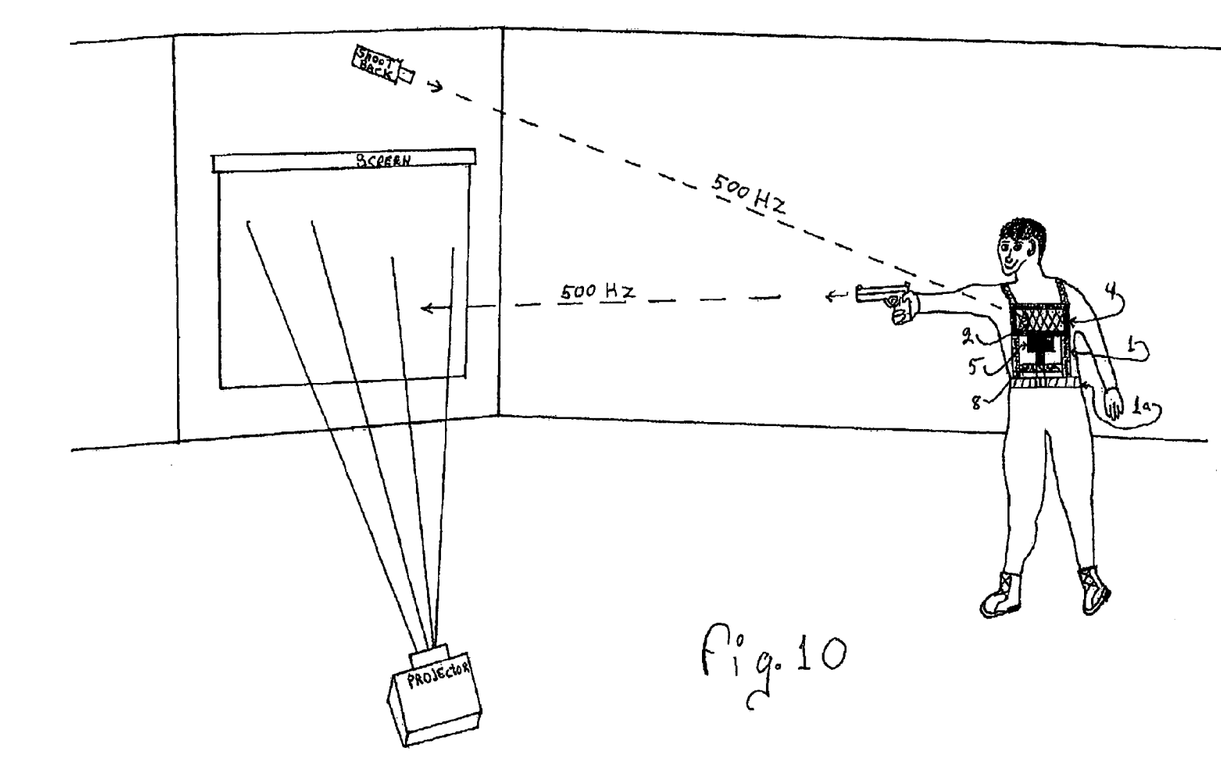
FIG. 10. This drawing depicts Another Use for the Laser Engagement Stun System. It can be used as a shoot back Cannon on a Shooting Simulator. When the Shooter does not shoot fast enough or if he misses his target, the LESS Cannon shoots him.
Figure 11:
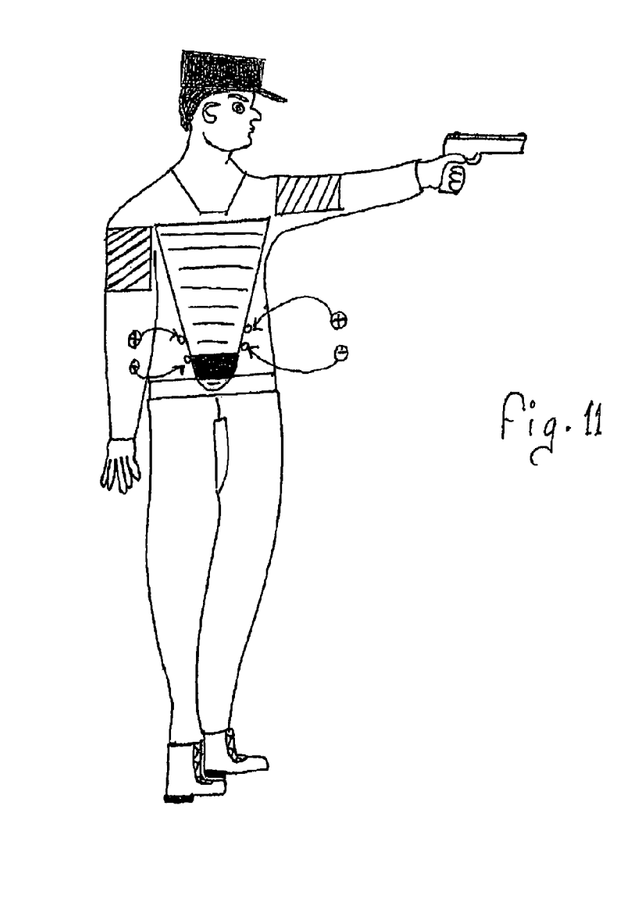
FIG. 11 This drawing depicts Another Use for the Laser Engagement Stun system. It can be used for Indoor or Outdoor Laser Tag. The vest drawn in FIG. 11 is a custom designed vest to cover the upper arm as well as the front and back of the player. The LESS Electronics are housed in the box area just above the belt in front.
Figure 12:
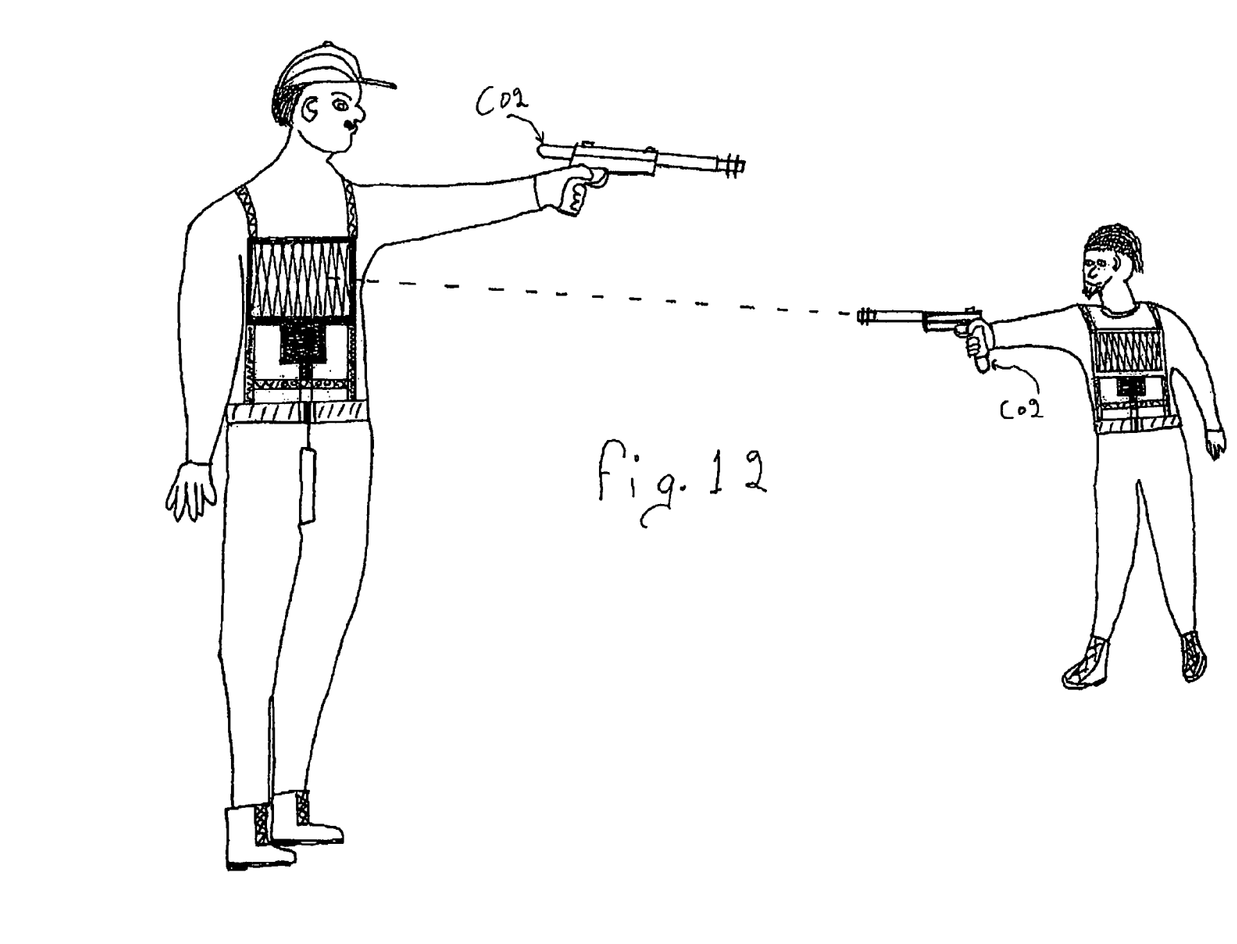
FIG. 12 This drawing depicts Another Use for the Laser Engagement Stun System. It can be used as an Electronic Paint Ball Laser Tag. A barrel Insert containing a 500 HZ visible Laser can fit down the barrel of the paint ball gun and be activated with a Dry Fire and used with the LESS.

FIG. 1 illustrates a Two Shooters engaged in one on one Training. Both are wearing the Laser Engagement Stun System mounted on load Bearing suspenders with a waste belt. The 2 large rectangular areas' on the chest of each player is a Sensor for detecting the other shooters Laser bullet as it hits their 2 vest sensor panel. When each person engages in the training exercises points his 9 weapon at the other and pulls the trigger, a Blank will fire or a Dry fire will cause the 10 Laser light/bullet to be emitted from the barrel of their weapon. When that 10 laser bullet strikes the 2 sensor panel, the 2, 16,17 sensor panels will send a small electrical pulse that is coded to the printed circuit board depicted in FIG. 7 The printed circuit board will disregard ambient light signals and upon receiving the 500 hz. FIG. 9 signal from the shooters 10 the laser bullet will cause the PCB to generate a high voltage 50,000 volts@0.1 milliamp, duration one second, to be transmitted via hard wires, to strategically located metal. Stun contacts attached to the outside of the Laser Engagement Stun System apparatus. The Idea Being to Simulate a Bullet Hit. As is depicted in FIG. 3., there are two or more rear facing 16,17 sensor panels to receive incoming laser bullet signals. The signal from the 16,17 rear sensor panels is transmitted via hard wire from the panels along the 19 shoulder straps. Hard wire 18,18a, are for future metal stun contacts to be placed on the rear of the apparatus. FRATRICIDE or FRIENDLY FIRE can be addressed by proper monitoring of the training exercises. A Radio Frequency sent to central command from each persons LESS will immediately identify WHO-SHOT-WHO, with GPS back up HQ will be able to tell, WHO, WHA, WHEN, AND WHERE. Using Odd numbers for one team & Even numbers for the other team Radio Freq. each team can be kept track of. This will help Identify who was shot, if it was friendly fire or opponent fire and did the person being shot step in HARMS WAY and get shot.

The Laser Engagement Stun System is a Man Worn Apparatus that uses Thin Film Amorphous Solar Cells as a Sensor to detect a Laser Light being shot at it from an opposing force.

The Electronics on the Printed Circuit Board will convert the incoming laser light signal into a High Voltage Electrical Shock/Stun. The person wearing the LESS in the Force on Force training exercise will experience the shot by feeling it. All those participating in the Force on Force training exercise will be equipped with the Laser Engagement Stun System and all weapons in the small arms category will be equipped with a 500 HZ Laser Light Device inside or mounted outside their weapon. When the shooter is shooting at the opposing force and pulls the trigger on his weapon a blank round will fire or a Dry fire will activate the Visible Laser Light that will be emitted by their weapon. This coded signal will activate the Solar Cell Sensor located on the LESS gear worn by the opponent. The LESS electronic circuit will generate a 50,000 Volt Low Amperage Shock for one sec. The opponent will feel a stinging or stun from the Electrical shock to SIMULATE BEING HIT BY A BULLET.

It is further intended that any other embodiments of the present invention that result from any changes in application or method of use or operation, method of manufacture, shape, size, or material which are not specified within the detailed written description or illustrations contained herein yet are considered apparent or obvious to one skilled in the art are within the scope of the present invention.

I claim:

1. A laser engagement stun system comprising:
   a laser device arranged to generate a coded pulse laser comprising light in the form of a coded pulse;
   a man worn apparatus arranged to be worn by a user and being separate from the laser device;
   electrical contacts supported on the apparatus so as to be arranged to deliver a high voltage stun to a user of the apparatus;
   a solar cell supported on the apparatus, the solar cell being arranged to generate a coded signal in response to being electrically charged by the coded pulse laser from the laser device; and
   an electronic circuit board supported on the apparatus, the electronic circuit board being arranged to detect the coded signal from the solar cell such that the electronic circuit board can discriminate between ambient light and the coded pulse laser, and the electronic circuit board being arranged to convert the coded signal to a high voltage stun delivered to the electrical contacts;
   whereby the system is arranged for force on force training or in conjunction with a shooting simulator shoot back system.

2. The system according to claim 1 wherein the solar cell comprises a thin film flexible amorphous solar cell.

3. The system according to claim 1 wherein the laser comprises a red laser.

4. The system according to claim 3 wherein the red laser is in a range of approximately 630 to 650 nanometers.

5. The system according to claim 1 wherein the coded pulse of the laser corresponds to 500 Hz to 1500 Hz.

6. The system according to claim 1 wherein there is provided a filter covering the solar cell, the light of the laser and the filter being the same color such that the solar cell is less sensitiye to light having a different color than the light of the laser.

7. The system according to claim 6 wherein the laser comprises a red laser and the filter comprises a red filter such that the solar cell is less sensitive to other than red light.

8. The system according to claim 1 wherein the electronic circuit board is arranged to deliver the high voltage stun to the electrical contacts via hard wires.

9. The system according to claim 1 wherein the apparatus comprises a vest arranged to be worn by the user.

10. The system according to claim 1 wherein the apparatus comprises a belt arranged to be worn by the user.

11. The system according to claim 1 wherein the electronic circuit board includes a timer, said timer being arranged to control duration of the high voltage stun to a prescribed duration of the timer.

12. The system according to claim 1 wherein the electronic circuit board includes a timer arranged to prevent delivery of a second high voltage stun to the electrical contacts subsequent to delivery of a first high voltage stun for a prescribed duration of the timer.

13. The system according to claim 12 wherein the timer is arranged to restart the prescribed duration in response to the detection of a coded signal from the solar cell during the prescribed duration.

14. The system according to claim 1 wherein the laser device comprises a weapon which is arranged to emit the coded pulse laser in response to the weapon being triggered by a second user different from the user upon which the apparatus is arranged to be worn.

15. The system according to claim 1 wherein the electronic circuit board is arranged to trigger a visual indicator in response to detection of the coded signal.

16. The system according to claim 1 wherein the electronic circuit board is arranged to trigger an audible indicator in response to detection of the coded signal.

17. The system according to claim 1 wherein there is provided a vibrator motor arranged to be supported on the apparatus, the electronic circuit board being arranged to selectively actuate the vibrator motor instead of delivering the high voltage stun to the electrical contacts.

18. The system according to claim 1 wherein there is provided a battery associated with the electronic circuit board, the electronic circuit board being arranged to charge the battery in response to the solar cell being electrically charged by ambient light.

19. The system according to claim 18 wherein there is provided a filter covering the solar cell which is the same color as the laser and wherein there is provided an auxiliary solar cell which is unfiltered and arranged to charge the battery.

20. The system according to claim 1 wherein the electronic circuit board is arranged to transmit a radio frequency signal to a remote location, the radio frequency signal corresponding to an identification of the coded pulse laser.

* * * * *